United States Patent [19]

Andrews

[11] 4,332,506

[45] Jun. 1, 1982

[54] WAVE-AND-TIDE-PUMP APPARATUS AND METHOD THEREOF

[76] Inventor: Ottie H. Andrews, 1562 W. Katella Ave., Anaheim, Calif. 92802

[21] Appl. No.: 163,301

[22] Filed: Jun. 26, 1980

[51] Int. Cl.³ .......................... E02B 9/08; E02B 7/44
[52] U.S. Cl. ..................................... 405/77; 405/101
[58] Field of Search ................................. 405/75–79, 405/100, 101; 60/502; 137/527; 417/330, 334; 290/42, 53

[56] References Cited

U.S. PATENT DOCUMENTS

| Re. 11,807 | 1/1900 | Rogowski | 405/77 |
| 2,577,325 | 12/1951 | Haskell | 405/76 |
| 4,040,257 | 8/1977 | Andrews | 405/77 |

Primary Examiner—David H. Corbin
Assistant Examiner—Nancy J. Pistel
Attorney, Agent, or Firm—Francis X. LoJacono

[57] ABSTRACT

A wave-and-tide-pump apparatus and method to provide a continuous flow of water from a large body of water to a small body of water, whereby the wave-and-tidal action of the first larger body of water is funneled into the second smaller body of water by means of a pump which is connected therebetween, the pump apparatus comprising an inlet mouth having a freely pivoted, flap-gate member that opens in the direction of the wave flow or incoming tide, thus allowing water to flow into a receiving reservoir and then pass through a conduit or tunnel which is connected to the second body of water, the water entering at a point opposite the natural inlet/outlet of the second body of water, thereby providing a continuous flow of water through the second body of water and establishing a flushing action.

5 Claims, 3 Drawing Figures

WAVE-AND-TIDE-PUMP APPARATUS AND METHOD THEREOF

FIELD OF THE INVENTION

This invention relates to an apparatus for transferring water from a first larger body of water and deposit it in a second smaller body of water; and it relates in particular to a combination wave-and-tide-pump apparatus to create a continuous flow of water through the second smaller body of water.

DESCRIPTION OF THE PRIOR ART

Various types of water-flow apparatuses are well known in the art, including many tried and untried methods of transporting water from one body of water to another. However, many problems and difficulties have been encountered in providing an apparatus and/or method of conveying large volumes of water from coastal waters to connecting inland waterways or bay areas.

As for example, many bay areas found adjacent and connected to larger bodies of water have a stagnation and siltation problem, because the back-bay areas thereof do not receive the sufficient forceful flow of water that prevails at the inlet/outlet of the bays. There are numerous waterways adjacent coastal areas that require not only fresh water but a continuous circulation or flow of water passing from the inlet/outlet of the bay to the back-bay areas, and then back out through the inlet/outlet. By providing such a continuous flow, large amounts of silt and sand can be washed out of the bay-area boundaries so as to rehabilitate areas that have become too shallow to be of any use.

Many bay areas lack a second point of water entry and are provided with only one opening or inlet, which is generally insufficient to generate enough energy by means of the in-and-out tidal flow to clear the silt or to prevent said bars from forming within the waterways, particularly in back-bay areas.

Thus, there is a genuine need for an apparatus that can be installed along coastal waterways and operate in conjunction with the associated wave-and-tidal action, so that the water therefrom is pumped in a continuous manner, thereby generating the necessary energy and flow volume to flush out silt and excess sand from the coastal waterways, and also to make still other unused waterways fit for navigation.

The following are issued U.S. patents pertaining to the related subject matter but not specific to the herein-disclosed apparatus:

U.S. Pat. No. 1,094,310 to C. A. Deal; U.S. Pat. No. 1,376,889; U.S. Pat. No. 1,623,369; a tidal-flushing system disclosed in U.S. Pat. No. 3,492,822; and U.S. Pat. No. 4,040,257 which is held by the present applicant of the herein disclosed invention.

SUMMARY OF THE INVENTION

This invention provides a combination wave-and-tide-pump apparatus that is adapted to be located along a predetermined area of large body of water having wave-and-tidal conditions such as are generally found in coastal waterways. The present apparatus is designed to allow a continuous unilateral flow of water therethrough by capturing each incoming wave within its structure, wherein the force generated by each succeeding wave moves the continuous flow of water through the apparatus and then discharges it at a predetermined point within a second smaller body of water—such as, for example, a bay having only one inlet.

The apparatus comprises a structure positioned adjacent the edge of the larger body of water and is partly submerged therein, a funnel-like-mouth entrance being formed by the structure so that water flows by means of both the change in tide levels and the force of the associated waves. The water is constricted as it is channeled through and passes a flap-gate—thus permitting water under force to enter the contiguously positioned reservoir, which is formed by the structure, rearwardly of the mouth entrance.

As the surge of each wave passes over the hinged gate, the gate will return to an upright closed position, preventing water in the reservoir from flowing back to the entrance side. Thus, water in the reservoir traverses through a conduit connected to or terminating in the smaller body of water. This provides a continuous supply of fresh incoming water, thus creating better circulation within the smaller body of water, particularly as the tide begins to lower. With the constant flow of incoming water through the pump apparatus, a strong current can be created to move through the bay and out of the existing bay inlet. This current flow will then carry the silt and light sand back into open waters—thus maintaining the inland waterway free from stagnation, and also free from silt and debris.

OBJECTS AND ADVANTAGES OF THE INVENTION

The present invention has for an important object a provision for utilizing the continuous movement of waves and tides generated within large bodies of water, particularly coastal waterways, whereby the force thereof is used as a means to operate a continuous water-flow pump, the water passing therethrough being deposited within a second, but generally smaller, body of water.

It is another object of the invention to provide a combination wave-and-tide-pump apparatus that causes a current flow within the second body of water to a point where the current flow is strong enough to transport silt, light sand, and debris therefrom.

It is a further object of the invention to provide a combination wave-and-tide-pump apparatus that is selectively located along a coastal waterway; and whereby the waves generated therein are allowed to enter the mouth portion of the pump—the wave-and-tidal action being directed into the second smaller body of water by means of converging walls that act as a funnel.

It is a still further object of the invention to provide an apparatus of this character that is simple and rugged in construction, and that is capable of withstanding constant forces placed upon it for a relatively long period of time.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only.

DESCRIPTION OF THE PREFERRED EMBODIMENT

Figure 1:
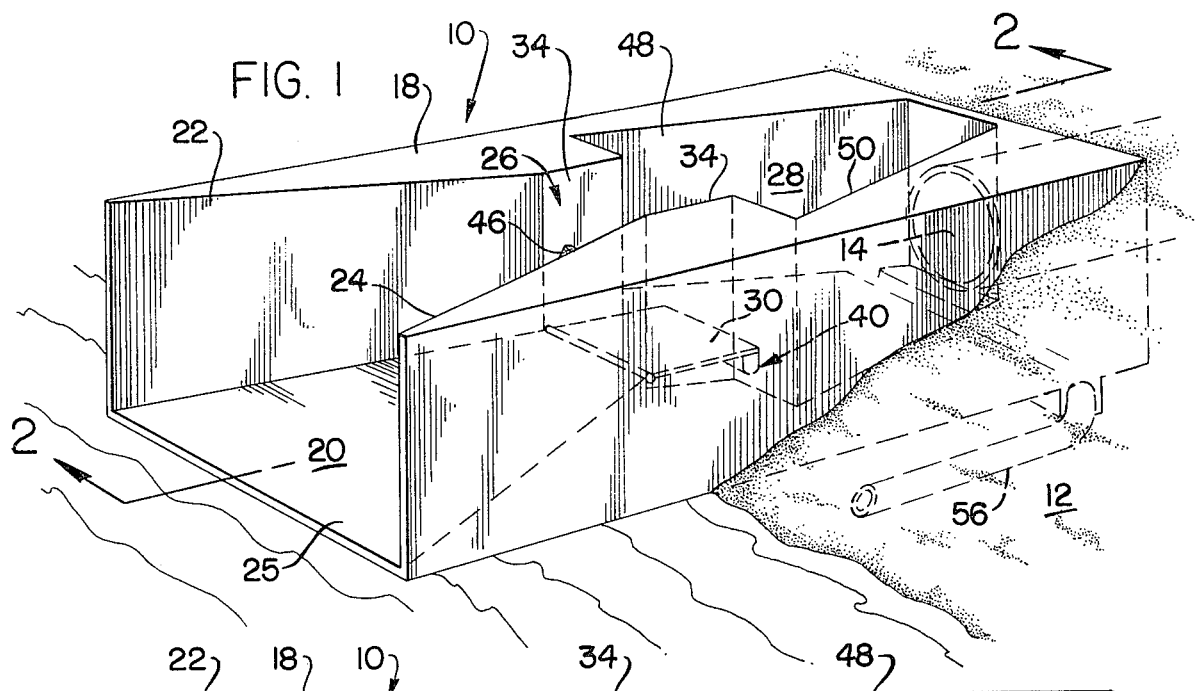
FIG. 1 is a pictorial view of the present invention located along a shore line positioned to receive the waves from the surrounding body of water.

Referring more particularly to the drawings, there is shown a combination wave-and-tide-pump apparatus, generally indicated at 10, said apparatus being designed so as to be positioned at a predetermined location within the shore line 12 of a larger first body of water. That is, the apparatus is located adjacent to a body of water that is affected by wave-and-tidal action, and is situated next to or near a point of connection between the first body of water and a second generally smaller body of water.

For explanation purposes, the first body of water is represented by an ocean having a contiguous bay, wherein the bay is provided with a single ingress-and-egress waterway, which hereinafter will be referred to as the mouth of the bay. Accordingly, the apparatus is located along the coast line and is interconnected by means of a conduit 14 which terminates and empties into the bay, generally at a location opposite from the mouth of the bay.

Thus, as water is received from the ocean or coastal side, it is pumped into the bay, thereby causing a flow of current across the bay and then forcing it to exit back through the mouth of the bay. Hence, water can only be allowed to flow in one direction through apparatus 10. A unilateral flow-control means, designated at 16, is provided within the pump-housing structure 18. The housing structure can be made or formed from various suitable materials, but it is contemplated that a reinforced concrete member will be employed.

Accordingly, the combination wave-and-tide pump apparatus 10 comprises housing structure 18 having an inlet mouth 20 defined by a pair of oppositely disposed side walls 22 and 24, and a bottom inclined floor 25.

The side walls converge inwardly, providing the funnel like opening or mouth 20. Thus, water entering the mouth area is compressed and forced through a contiguously formed throated neck portion 26 which is interposed between mouth entrance 20 and a reservoir chamber 28.

Operably mounted within the throated neck portion 26 is a valvular-control gate 30, said gate being hingedly attached to the lower forwardmost point 32 of the throated neck member 26. Throated neck member 26 is defined by oppositely disposed parallel walls 34, and has an inclined bottom floor 36, whereby floor 36 inclines downwardly from front to rear, or from mouth 20 rearwardly to reservoir 28.

Figure 2:
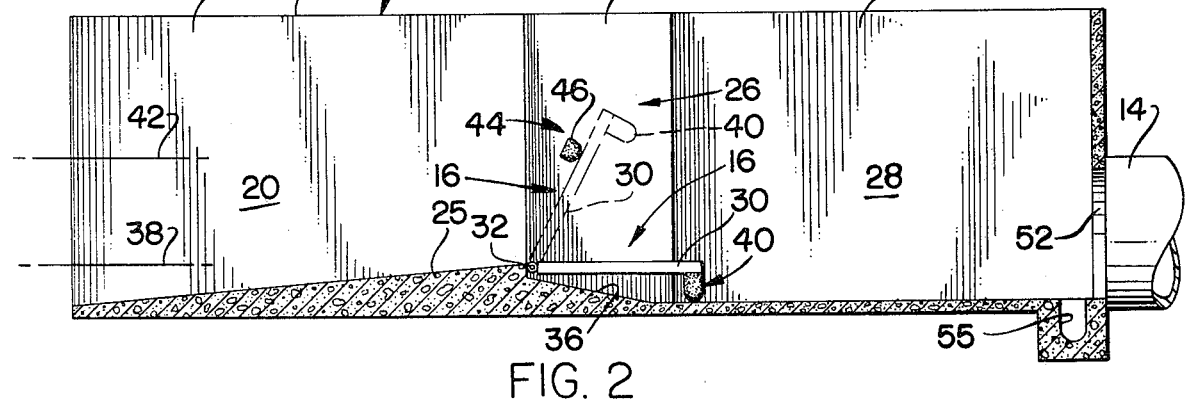
FIG. 2 is a cross-sectional view taken substantially along line 2—2 of FIG. 1, showing the flow-control gate in a retracted position in full lines and in an upwardly closed position in phantom lines.
Figure 3:
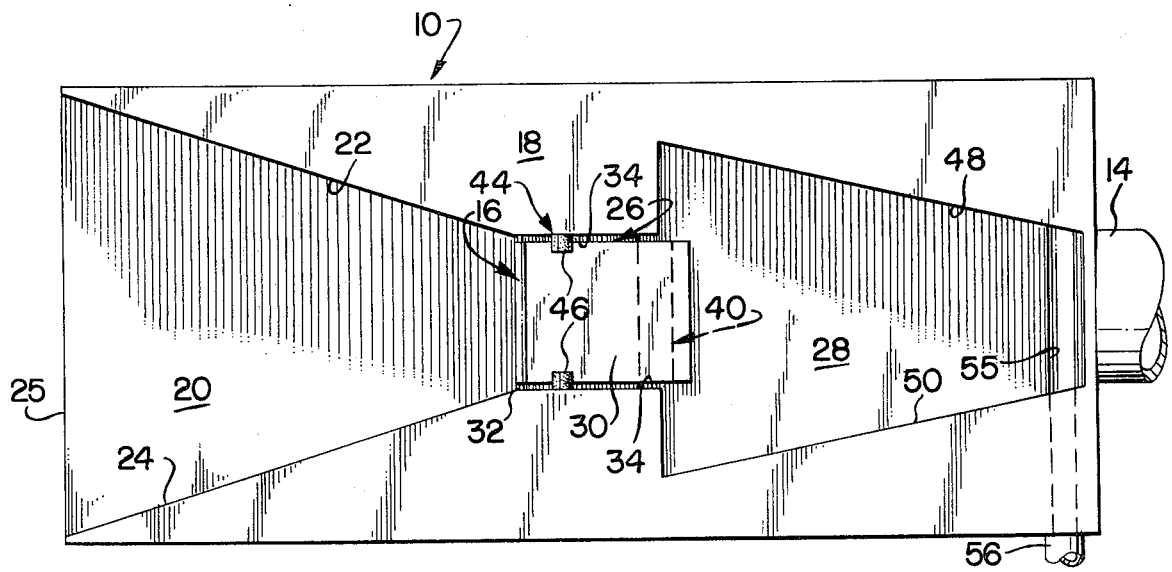
FIG. 3 is a top-plan view thereof.

As illustrated in the cross-section view of FIG. 2, valvular-control gate 30 is positioned in a substantially horizontal mode, whereby the low-tide level, indicated at 38, along with associated waves allows the gate to be relatively positioned with respect thereto by means of a float 40 secured to the upper end of gate 30. Hence, gate 30 will float with the level of the tide, allowing the waves to pass over it and then return to the previous tide level—thus preventing back flow of the water.

High-tide level is indicated at 42; and thus it can be understood that, by means of float member 40, gate 30 will rise to that level but is limited in its upward or rearward movement by stop means 44 defined by oppositely disposed bumper members 46.

As water is forced through neck 26, it is received in reservoir 28 which is also defined by opposed converging walls 48 and 50, forming a second funnel-like passage whereby water in reservoir 28 is directed into conduit 14 through opening 52. From conduit 14, water is continuously pumped into the associated second body of water (bay). Thus, a current flow is established through the bay so as to exit the mouth of the bay, the current force thus carrying silt, light sand, and debris, which normally must be dredged therefrom.

It should be noted that various means can be provided to trap or prevent sand and other material from entering the flow system. One means for this purpose is shown by providing an inclined surface to bottom floor 25, whereby the surface rises upwardly and moves inwardly—providing an angular displacement substantially equal to or greater than the angle of the shore line.

An additional trap means is defined by outlet channel 55 which is positioned in front of the entrance of conduit 14. Sand and other heavy material is caught in channel 55 and is washed out through a connected side pipe 56, pipe 56 being arranged to flush the sand back to the shore line 12.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A wave-and-tide pump for installation along the shore line of a first body of water affected by wave-and-tidal action, to provide a constant flow of water to a second but smaller body of water which includes an inlet mouth, said pump and said inlet mouth being oppositely disposed to each other, said wave-and-tide pump comprising:

a housing structure having a funnel-like-inlet-mouth portion and a discharge opening oppositely disposed thereto, said inlet mouth being positioned to accept incoming water flow by means of tidal changes and wave action;

said mouth portion including a pair of inwardly converging side walls, and an inclined bottom floor extending inwardly and upwardly, providing an angular displacement substantially equal to or greater than the angle of the shore line of said first body of water;

a throated neck portion contiguously positioned aft of said mouth portion, whereby water is funneled from said mouth portion thereof to said neck portion, said throated neck portion being defined by oppositely disposed parallel side walls, and a rearward downwardly sloping bottom wall;

a reservoir chamber contiguously associated with said throated neck portion to receive water therefrom, said reservoir chamber being defined by a bottom wall having oppositely disposed side walls converging rearwardly and terminating inwardly at said discharge opening;

a unilateral flow-control means interposed between said inlet mouth and said throated neck, said means being operated by said waves entering said inlet mouth thereof;

wherein said unilateral flow-control means comprises:

a valvular-control gate hinged in the bottom of said throated neck portion; and a floatation member attached to said gate, whereby said gate never drops below the level of the tide;

stop means mounted in said neck portion to limit the movement in one direction of said unilateral flow-control means; and an interconnecting conduit connected between said discharge opening and said second body of water, whereby a continuous flow of water is transferred from the first body of water to the second body of water, and wherein a current flow is established within said second body of water, so that the water passes out through the inlet mouth thereof.

2. A wave-and-tide pump as recited in claim 1, wherein said stop means comprises a pair of bumper members secured to said side walls of said neck portion for engagement with said control gate, whereby the water within said rearward reservoir is prevented from discharging back into the first body of water.

3. A wave-and-tide pump as recited in claim 2, including a trap means formed within said housing structure to prevent sand and other heavy material from entering said discharge opening thereof.

4. A wave-and-tide pump as recited in claim 3, wherein said trap means comprises an inclined surface formed on said bottom floor of said mouth portion, said inclined surface extending inwardly and upwardly.

5. A wave-and-tide pump as recited in claim 3, wherein said trap means comprises an outlet channel formed in said bottom wall of said reservoir chamber adjacent said discharge opening.

* * * * *